United States Patent [19]

Youngquist

[11] 4,211,694

[45] Jul. 8, 1980

[54] DEFLAVORING VEGETABLE SEED MATERIALS

[75] Inventor: Rudolph W. Youngquist, Cincinnati, Ohio

[73] Assignee: The Procter & Gamble Company, Cincinnati, Ohio

[21] Appl. No.: 922,921

[22] Filed: Jul. 7, 1978

[51] Int. Cl.$^2$ ............................................... A23J 1/14
[52] U.S. Cl. .................................. 260/123.5; 426/656
[58] Field of Search ........................ 260/112 R, 123.5

[56] References Cited

U.S. PATENT DOCUMENTS

| 2,278,670 | 4/1942 | Rauer | 260/123.5 |
| 3,069,327 | 12/1962 | Eldridge et al. | 260/123.5 X |
| 3,407,076 | 10/1968 | Ganz | 260/112 R X |
| 3,762,929 | 10/1973 | DeLapp | 260/123.5 X |
| 3,792,175 | 2/1974 | Schmitt | 260/123.5 X |
| 3,828,017 | 8/1974 | Finley et al. | 260/112 R X |
| 3,842,062 | 10/1974 | Eastman | 260/112 R |
| 4,072,671 | 2/1978 | Sodini et al. | 260/123.5 |

OTHER PUBLICATIONS

Plant Physiology, vol. 42, 1967, pp. 797–813, Tombs.
Archives of Biochemistry and Biophysics, 95:402–404, (1961), Aitschul et al.
Plant & Cell Physiol., 16:933–937, (1975), Mikola et al.

Primary Examiner—Howard E. Schain
Attorney, Agent, or Firm—Jerry J. Yetter; Julius P. Filcik; Richard C. Witte

[57] ABSTRACT

A process for deflavoring vegetable seed material, especially oleaginous seed protein material, using a ternary single-phase solution of water, an electrolyte, and a carbohydrate, said solution having a water activity of less than about 0.90.

10 Claims, 1 Drawing Figure

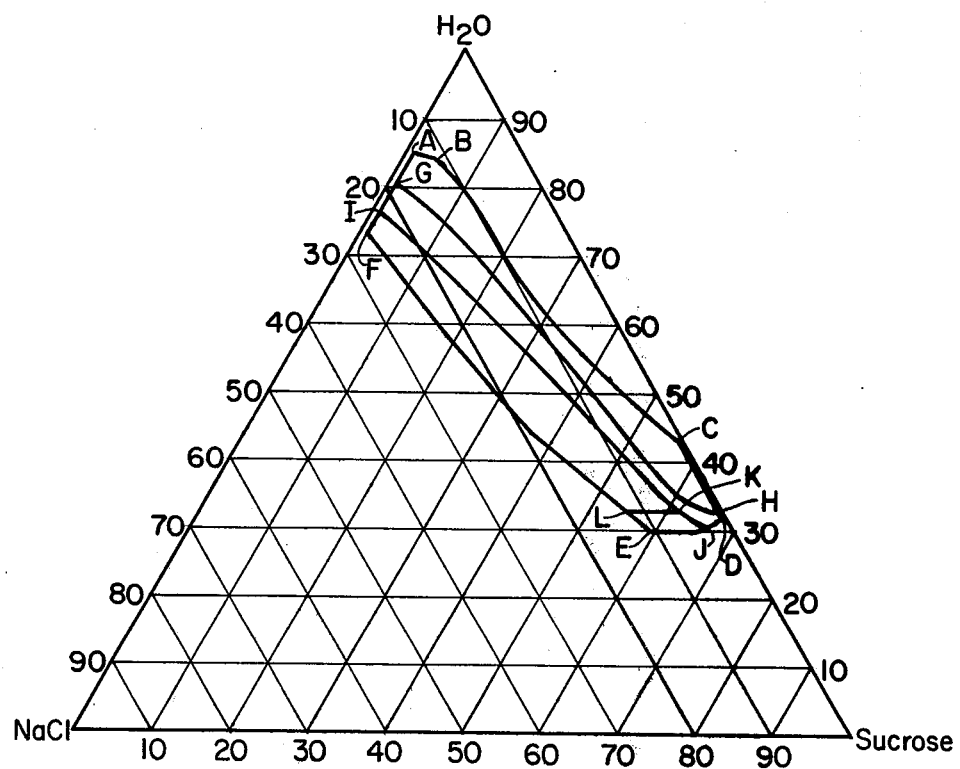

DEFLAVORING VEGETABLE SEED MATERIALS

TECHNICAL FIELD

Many types of vegetable seeds, especially oleaginous seeds such as soybeans and cottonseed, contain protein of sufficient quality and concentration to be nutritionally useful for humans. Unfortunately, because the vegetable seeds are often in a form unacceptable to human tastes, their valuable protein material is not conveniently used. Soybean seeds, for example, have high concentrations of protein, and a high protein efficiency ratio, but they also have seed flavor notes unacceptable to humans. The soybean flavor has been variously described as bitter, green beany, phenolic, and cereal-like.

The literature reports many attempts to develop processes for deflavoring vegetable seed materials, and soybeans in particular, to make their protein extracts bland. These deflavoring processes have involved harsh procedures such as steam extraction, hot alcohol extraction, flammable solvent use and caustic treatment. At least one inherent disadvantage in such deflavoring processes is that they tend to detrimentally affect the physical-chemical characteristics of the protein through denaturation. Denatured proteins are difficult to use in some commercial processes.

It can be appreciated that there is a continuing need for commercially feasible processes to remove the undesirable flavor notes present in oleaginous and other vegetable seeds and to recover the deflavored seed material without adversely affecting the desirable physical-chemical properties of the protein contained therein. Successful deflavoring techniques allow direct human consumption of the vegetable protein found in previously unpalatable sources, for example, in the protein-rich residues which are left after the oil is extracted from oleaginous seeds such as soybeans and cottonseeds.

The present invention provides a means for conveniently deflavoring vegetable seed material, especially oleaginous seed protein material. In this process, a toxicologically-acceptable, ternary solvent system comprising water, a carbohydrate (e.g. sucrose), and an electrolyte (e.g. sodium or potassium chloride) is used to deflavor the vegetable seeds.

BACKGROUND ART

British Pat. No. 1,476,086, Bush Boake Allen, Ltd., June 1, 1977 relates to the removal of undesirable soy flavor components to obtain a bland product. The invention disclosed involves bubbling gas through a soy flour/water suspension to form a foam containing the undesirable flavor elements.

U.S. Pat. No. 3,142,571, McAnelly, July 28, 1964 discloses the preparation of soy materials by preparing a dough from soy flour, and cooking the dough using live steam. The resulting cooked dough is extracted by steeping it in or percolating it with water to remove water soluble flavor components.

Other methods for deflavoring soy materials use lower aliphatic alcohols in the extraction medium for removing the undesired flavor elements. U.S. Pat. No. 3,043,820, Beaber, et al., July 10, 1962 discloses a deflavoring process involving pretreating defatted soy flour with an alcohol, such as ethanol or methanol, and, subsequently, dissolving the pretreated protein in an aqueous solution, reprecipitating the protein through isoelectric precipitation and recovering the protein through centrifugation.

U.S. Pat. No. 3,630,753, Melnychyn, Dec. 28, 1971 discloses an alkaline extraction procedure in which the soy protein is solubilized at pH 9.5–12.5. The protein is subsequently isoelectrically precipitated, the mixture is centrifuged and the mixture is contacted with alcohol to improve the flavor.

U.S. Pat. No. 3,762,929, DeLapp, Oct. 2, 1973 discloses a deflavoring method for treating soybean flakes involving placing the flakes in aqueous contact with a polysaccharide such as carboxymethyl cellulose, carrageenan or agar and then separating the soy flakes.

U.S. Pat. No. 3,998,800, Youngquist, discloses a deflavoring process using a ternary single phase, flammable, solvent system comprising a mixture of water, a slightly polar oxygen-containing organic solvent, such as ethanol, and a nonpolar hydrocarbon, such as hexane.

U.S. Pat. No. 3,714,210, Schweiger, et al., Jan. 30, 1973 discloses the production of deflavored soy concentrate by using a two-phase ternary solvent system using solvents such as hexane, methanol, and water.

Two additional references relate to the separation of soy protein from residual cellular material. M. P. Tombs, *Plant Physiology*, 42, 797 (1967) describes a method of isolating protein bodies from soy meal by density gradient centrifugation using an aqueous sucrose solution, but does not disclose deflavoring effects. U.S. Pat. No. 3,794,735, Newsom, et al., Feb. 26, 1974 discloses the separation of protein from lipid-containing seeds using emulsification, centrifugation, isoelectric precipitation. Edible salts are added to decrease the viscosity of the final product.

BRIEF DESCRIPTION OF THE DRAWINGS

The FIGURE illustrates a phase diagram of the preferred water/carbohydrate/electrolyte system in which the carbohydrate is sucrose and the electrolyte is sodium chloride.

The area bounded by ABCDEF defines the concentrations of the components used in a preferred solution Line AB represents the boundary where the density is 1.10; Line BC represents the boundary where the water activity, $(a_w)$ is 0.90; Line CD represents the boundary where the concentration of sodium chloride is 1%; Line DEF represents the phase boundary between the ternary monophase solution used in this invention and the various multiphase systems which can be formed with water, sucrose, and sodium chloride; and Line FA represents the boundary where the concentration of sucrose is 1%. The area bounded by ABCDEF describes a solution having a density of from about 1.1 to about 1.5 and a water activity of less than 0.9.

The area bounded by FGHDE defines the more preferred solution in the manner of claim 2. The boundary GH corresponds to a water activity of 0.85.

The area bounded by FIJE defines a still more preferred solution used in the manner of claim 3. The Line FI represents the boundary where the concentration of sucrose is 1%; Line IJ represents a water activity of 0.8; and Line JEF represents the phase boundary of the solution. The more preferred compositions of the area bounded by FIJE have water activities of about 0.5 to about 0.8.

The area bounded by FIKL defines the solution of claim 4 which is also the most preferred solution. For water/sucrose/sodium chloride solutions, Line FI represents the boundary where the concentration of sucrose is 1%; Line IK represents a water activity of 0.8; Line KL represents the boundary where the solution viscosity is 300 cp; and Line LF defines the phase boundary. The area bounded by FIKL defines a solution having a water activity of from 0.5 to 0.8 and a viscosity of from about 1 cp to about 300 cp.

DISCLOSURE OF THE INVENTION

The present invention encompasses a process for deflavoring vegetable seed material, comprising suspending comminuted vegetable seed material in an aqueous solution of an electrolyte, at a concentration greater than about 1%, and a carbohydrate, at a concentration greater than about 1%, said solution having a water activity of less than 0.90, and separating the vegetable seed material from the solution.

The present invention takes advantage of the unexpected discovery that vegetable seed materials, especially oleaginous seed materials, can be rendered organoleptically bland, that is, can be deflavored, by a solvent treatment procedure which employs a single phase aqueous solution of an electrolyte and a carbohydrate. Not only are the undesirable flavors of the seed materials removed, but the protein materials are substantially unchanged in their physical properties. Through the careful control of water activity, vegetable seed materials can also be deflavored without adversely hydrating or solubilizing the proteins. The product is a deflavored, bland material having superior flavor and containing protein which has retained its physical characteristics.

By "deflavoring" as used herein is meant the removal of objectionable flavor notes which are characteristic of certain vegetable materials, particularly of oleaginous seeds such as soybeans.

By "vegetable seed material" as used herein is meant plant seeds containing protein bodies and aleurone grains as well as the protein recovered from such seeds. Among the vegetable seed materials useful herein are cereal grains such as rice, oats, barley, millet, corn, and grain sorghum and non-oleaginous legumes such as peas, broad beans, and lentils.

By "oleaginous seed materials" is meant the preferred class of vegetable seed materials including such oil- and protein-rich seeds as cottonseeds, soybeans, peanuts, rapeseed, copra, sunflower seeds, and the like, and the proteins isolated from them. The most preferred oleaginous seed material is the seed of the soybean. The oleaginous seed material can be in the form of meals, flours, or other forms.

The oleaginous and other seed materials can be oil (lipid) containing or defatted. One step in many commercial seed processing procedures, primarily for oleaginous seeds, is a lipid extraction step. Pressing or organic solvent extraction is used to recover the valuable oleaginous seed oil. This step is commonly called "defatting" and the oleaginous seed residue is said to be defatted. Such defatted oleaginous seed materials can also be used in the present invention. Additionally, the proteins contained in the oleaginous seeds can be separated from the residual seed material, as isolates, for example, by other procedures and can then be deflavored by the instant process.

By "oleaginous seed protein material" and "protein material" as used herein is meant the protein of oleaginous seed isolates and the protein contained in aleurone grains and protein bodies, as well as protoplasmic seed protein. "Protein granules", used herein to mean aleurone grains and protein bodies, are discrete particles of reserve or storage protein and are typically found in the seeds of many species of plants. In seeds of oleaginous plants, aleurone grains and protein bodies are the major protein component. The size of the protein granules in oleaginous seeds ranges from 1 micron to 20 microns, but is typically from 2 microns to 8 microns.

By "electrolyte" as used herein is meant a chemical substance which ionizes in the presence of water to form cations and anions and which will provide ionic conductivity when dissolved in water. Electrolytes which can be used herein include the alkali metal halides and alkali metal phosphates; examples include lithium chloride and potassium and sodium dihydrogen phosphate. Sodium chloride and potassium chloride are highly preferred electrolytes and potassium chloride is particularly preferred if a low sodium protein product is desired.

By "carbohydrate" as used herein is meant a water-soluble saccharidic compound of carbon, hydrogen, and oxygen that contains the saccharose grouping. Soluble monosaccharides, disaccharides, and low molecular weight polysaccharides are preferred types of carbohydrates suitable for use herein.

Monosaccharides useful herein include simple sugars such as fructose and glucose. Disaccharides include such compounds as sucrose, maltose, and lactose.

The carbohydrates used herein can be either purified or unrefined. For example, corn syrup, a mixture of glucose, maltose, and maltodextrine, can be used as the carbohydrate component. Highly preferred carbohydrates are the nonreducing disaccharides, in particular, sucrose. Other carbohydrates which can be used herein include fructose, glucose, raffinose, stachyose, corn syrup solids, low molecular weight dextrans, and soluble plant sugars.

The term "water activity" is used herein in its usual context to mean the ratio of the fugacity of water in a solution (f) to that of pure water ($f_o$) at the same temperature. The water activity of a solution can be conveniently measured on a Sina Hygrometer, Type SMT-B, which provides a direct determination of $a_w$. The water activity of an ideal aqueous solution is 0.9823 for a 1.0 molal solution. Non-electrolytes depart from ideal behavior only slightly at low concentrations. However, as the concentration of electrolytes increases, their solutions depart significantly from ideal behavior.

By "comprising" is meant that other materials can be present in the ternary solution and other processing steps can take place so long as they do not adversely affect either the vegetable material or the physical chemical characteristics of the aqueous solution used for the density fractionation. Thus, the term "comprising" encompasses the more restrictive terms "consisting essentially of" and "consisting of".

By "separating" as used herein is meant procedures by which solid materials can be removed from liquid solutions. Centrifugation followed by physical removal as well as filtration are exemplary separation procedures.

By "isolating" as used herein is meant procedures by which particles of different densities can be separated from each other, and, especially, centrifugation followed by physical removal of layers of particles having different densities.

Composition percentages used herein are weight/weight.

To achieve an efficient deflavoring of the oleaginous seed material, it must be flaked, ground, or comminuted. The flaking, grinding, or comminution is to expose a large surface area of the seed particles to the deflavoring solution. A large exposed surface area will speed the deflavoring process; however, if the seed particles are too small, separation of the deflavored seed material from the deflavoring solution may be difficult.

Oleaginous seed materials are more easily ground or comminuted if the seed material is defatted to a lipid concentration of less than about 5% before grinding. The oleaginous seeds can be flaked and than defatted or can be subjected to the deflavoring process without defatting.

Any conventional method of defatting oleaginous seeds can be used. In most conventional defatting processes, the oleaginous seed is first roll milled or comminuted to form thin flakes or meal. This exposes a greater surface area and accelerates the defatting process. The thin flakes or meal are then either pressed to remove the valuable oil and lipid materials or extracted with a solvent such as hexane. The solvent is then removed by methods such as air drying to produce defatted oleaginous seed flakes, meal, or flour, all of which are suitable for use in the instant deflavoring process.

Any conventional mode of grinding can be used to reduce the particle size of the vegetable material. The following methods are acceptable: jet milling, pin milling, hammer milling, ball milling, or vibrational energy milling. Jet milling and vibratory energy milling are especially effective.

Where oleaginous seeds which have not been defatted are used, the seeds can be effectively ground by freezing the seeds and comminuting them with a hammer mill. An alternative, but less efficient method, is to use a colloid mill and extra, added seed lipid.

If ground seed material is used, the particle size should be in the range of about 20 to 150 microns. Where such comminuted material is used, preferably at least 90% by weight of the ground particles will be less than 80 microns in size.

In the preferred method of this invention, defatted soybean flakes, meal or concentrate with a lipid content of 0% to about 5% are milled to a particle size of about 30 to about 80 microns and are suspended in the deflavoring solution.

The comminuted seed material is added to a solution comprising the aqueous carbohydrate/electrolyte deflavoring solution of specified $a_w$.

The carbohydrate is the major element in controlling the density of the solution. The preferred density range for the deflavoring solutions of the present invention is from about 1.10 to 1.50 g/ml. When operating in this range, the deflavored protein (as protein granules) can be easily separated from the aqueous solution and can also be separated from the more dense, insoluble residual vegetable seed materials, such as cellulose and other insoluble carbohydrate materials, present in the seeds. A more preferred density range is from about 1.20 to about 1.50 g/ml and the most preferred density is from about 1.25 to about 1.50 g/ml. The carbohydrate also exerts a deflavoring effect as well as a small effect in reducing the activity of water.

The electrolyte in the deflavoring solution performs a two-fold function in addition to its deflavoring effect. First, it tends to lessen the viscosity of a carbohydrate/water solution to a small extent, thereby helping keep the viscosity of the solution in a more convenient range for handling. Second, it reduces the water activity of the solution thereby reducing the hydration, and thus the solubilization, of the deflavored seed proteins. The protein remains largely undissolved. Applicants have discovered that water activity has a detrimental effect on the protein of vegetable seeds. Unless the water activity is kept lower than about 0.9 and is preferably in the range of about 0.5 to about 0.85 and most preferably from about 0.5 to about 0.8, the protein hydrates and is solubilized, thereby reducing the amount of protein recovered. By reducing the water activity, the electrolyte helps maintain the deflavored protein in unhydrated and unsolubilized form so it can be efficiently recovered without resorting to precipitation techniques which can adversely affect the physical-chemical characteristics and the quality of the protein.

Still another benefit of the lower water activity required for the deflavoring is the inhibition of bacterial growth; something of an antimicrobial effect is achieved.

Food or feed-approved antibacterial, anti-fungal, and antioxidant agents can be added to the aqueous solution of the electrolyte and carbohydrate without deleterious effect. In fact, these additives are preferred when the deflavoring process is operated at or above room temperature for several hours.

At certain concentrations of electrolyte and carbohydrate, the solution may become inconveniently viscous, either from the suspended comminuted or flaked vegetable seed material or from dissolution of the soluble sugars naturally present in the seed material. For ease in handling the solution, it is preferred to maintain a viscosity of from about 1 centipoise to about 300 centipoise; a viscosity of from about 1 centipoise to about 100 centipoise is most preferred.

In a typical procedure, the comminuted vegetable seed matter is suspended, through intimate mixing, in the aqueous deflavoring solution of electrolyte and carbohydrate. Any conventional mode of mixing can be used. High shear mixing is preferred, but simple stirring is also an acceptable mode.

A vegetable seed material to solution ratio of about 1:4 to about 1:100 (parts by weight) is acceptable for use in this process. Preferred for use herein is an oleaginous seed to solution ratio of about 1:5 to about 1:20 (parts by weight).

The contact time between the carbohydrate/electrolyte/water deflavoring solution and the oleaginous protein material, as well as the temperature, affects the yield and the amount of protein ultimately recovered.

Generally from about 10 minutes to 24 hours of contact time is sufficient. Preferred mixing times are from 15 minutes to two hours. The time of mixing depends upon the temperature of the solution and the type of mixing used. Simple magnetic stirring at 25° C. requires about 1–2 hours. High shear mixing at a higher temperature requires less time.

The temperature at which the mixing occurs and at which the deflavoring is accomplished can be from about 0° C. to about 120° C., preferably from about 5° C. to 70° C., and most preferably from about 15° C. to about 50° C. The higher the temperature, the less viscous the solution and thus the easier to handle. However, as the temperature is increased, the rate of hydration of the protein, and hence its solubilization, increases as does the rate of denaturation of the protein. Thus, the control of water activity levels at temperatures higher than about 70° C. is more important to recover undenatured, deflavored protein.

After mixing, the oleaginous seed material is separated from the water/electrolyte/carbohydrate deflavoring solution. This separation can be done by any convenient method or combination of methods such as free draining, filtration, and centrifugation. Centrifugation is a preferred separation method where oleaginous seed material has been deflavored. In such a case, the oleaginous protein material present as protein granules can be isolated from the residual seed materials by following the centrifugation with a physical removal of the protein layer.

In such a case, the isolated protein fraction can be subjected to an optional concentration/extraction step using a water wash or water-alcohol wash to remove residual nonproteinaceous materials. Typically, a water/alcohol solution is used.

The alcohols suitable for practicing the optional concentration/extraction step include the lower molecular weight alcohols, such as ethanol, methanol, 1-propanol, 2-propanol, and the butanols. The most preferred alcohol is ethanol, for both organoleptic and safety reasons.

The preferred water-alcohol solvent mixture is from about 50 parts by weight to about 90 parts by weight alcohol, the balance being water. The most preferred water-alcohol system is from about 50 parts to about 70 parts ethanol and from about 30 to about 50 parts water (by weight).

The optional concentration/extraction step can be conducted in a temperature range from about 20° C. to about 60° C.; about 20° C. to about 30° C. is preferred.

Final desolventizing of the vegetable seed material recovered can be achieved by conventional means such as free draining, centrifugation followed by forced air drying, or filtration followed by drying, for example. The preferred methods are forced air drying of drained flakes at a temperature of from about 40° C. to about 90° C. and steam desolventizing.

| Best Mode of Carrying Out the Invention | |
|---|---|
| Liquid System | Parts by Weight |
| Sucrose | 44 |
| Sodium chloride | 16 |
| Water | 40 |

The ternary solvent system of sucrose, sodium chloride, and water has the density of 1.35 g/ml and an $a_w$ of 0.7. Defatted soy flour (100 g) having a particle size of between 20 and 100 microns is mixed with 500 g of the liquid system for 6 hours at 30° C. The mixture is then centrifuged at 2500 g for 45 minutes. Two semi-solid layers separated by a liquid layer are produced.

The semi-solid upper layer which contains the majority of protein is removed, washed with 300 g of a 50% ethanol aqueous solution at 40° C. to remove the residual liquid system, and air dried. The resulting product is much blander than the starting material and is devoid of the characteristic soybean odors.

Substantially the same results are obtained when the sodium chloride is replaced by an equivalent amount of potassium chloride or sodium dihydrogen phosphate.

When the defatted soybean flour is replaced by a defatted soybean meal or defatted soybean concentrate, similar results are obtained.

When the defatted soybean flour is replaced by peanut flour, defatted cottonseed meal, or defatted peanut concentrate, similar results are also obtained.

When the deflavored soy protein is supplemented with a nutritionally-supplemental amount of N-acetyl-L-methionine or its derivatives, in the manner disclosed in U.S. Pat. Nos. 3,878,305 and 3,952,115 incorporated herein by reference, the protein efficiency ration (PER) is about the same as for ground beef (3.0).

Industrial Applicability

EXAMPLE I

| Liquid System | Parts by Weight |
|---|---|
| Sucrose | 60 |
| Sodium chloride | 10 |
| Water | 30 |

200 Grams of soybean isolate is slurried with 2000 grams of the liquid system at room temperature for 2 hours. The liquid is removed from the isolate by filtration.

The wet isolate is then mixed with 400 grams of a mixture of 60 parts ethanol and 40 parts water. This process is carried out at room temperature.

The resulting soy protein is much blander than the starting soybean isolate in flavor.

When the soybean isolate of Example I is replaced by peanut protein isolate, similar results are obtained.

EXAMPLE II

| Liquid System | Parts by Weight |
|---|---|
| Corn syrup solids | 45 |
| Potassium chloride | 15 |
| Water | 40 |

Cottonseed isolate (50 grams) is slurried with the ternary liquid system above (1,000 grams) at about 30° C. for one and one-half hours. The isolate is separated from the liquid by filtration and is washed with a mixture of 50 parts alcohol and 50 parts water. The resulting protein tastes bland.

Protein products prepared from protein deflavored in the manner of Example I and II can be used as a food supplement for humans or lower animals. Various flavor elements can be added to the protein products to provide meat analogs in the form of "vegetable-based" ground beef analogs, vegetable-based ground beef patties, vegetable based sausage, vegetable-based meat in cheese-type spreads, and the like.

What is claimed is:

1. A process for deflavoring vegetable seed material, comprising:
    (a) suspending comminuted vegetable seed material in an aqueous solution comprising an electrolyte selected from the group consisting of alkali metal halides and alkali metal phosphates, at a concentration greater than about 1%, and a carbohydrate, at a concentration greater than about 1%, said solution having a water activity of less than about 0.90, and
    (b) separating the vegetable seed material from the solution.

2. A process according to claim 1 wherein said aqueous solution has a water activity of 0.85 or less.

3. A process according to claim 2 wherein said aqueous solution has a water activity of from about 0.5 to about 0.8.

4. A process according to claim 3 wherein said aqueous solution has a viscosity of from about 1 to about 300 centipoise.

5. A process according to claim 1 wherein said electrolyte is an alkali metal salt selected from sodium chloride and potassium chloride.

6. A process according to claim 1 wherein said carbohydrate is selected from the group of monosaccharides, disaccharides, trisaccharides, low molecular polysaccharides, or mixtures thereof.

7. A process according to claim 6 wherein said carbohydrate is selected from glucose, sucrose, and corn syrup.

8. A process according to claim 1 wherein the vegetable seed material is an oleaginous seed material selected from the group consisting of soybeans, cottonseed, sunflower seed, peanuts and copra.

9. A process according to claim 8 wherein said oleaginous seed material is soybean meal, flour, flakes, isolate or concentrate.

10. A process according to claim 9 wherein said carbohydrate is sucrose, glucose, or corn syrup solids and said electrolyte is potassium chloride or sodium chloride.

* * * * *